Oct. 19, 1954 H. L. MISCH 2,691,812
METHOD OF FORMING FLUID TURBINE ELEMENTS AND THE LIKE
Filed April 11, 1949 5 Sheets-Sheet 1
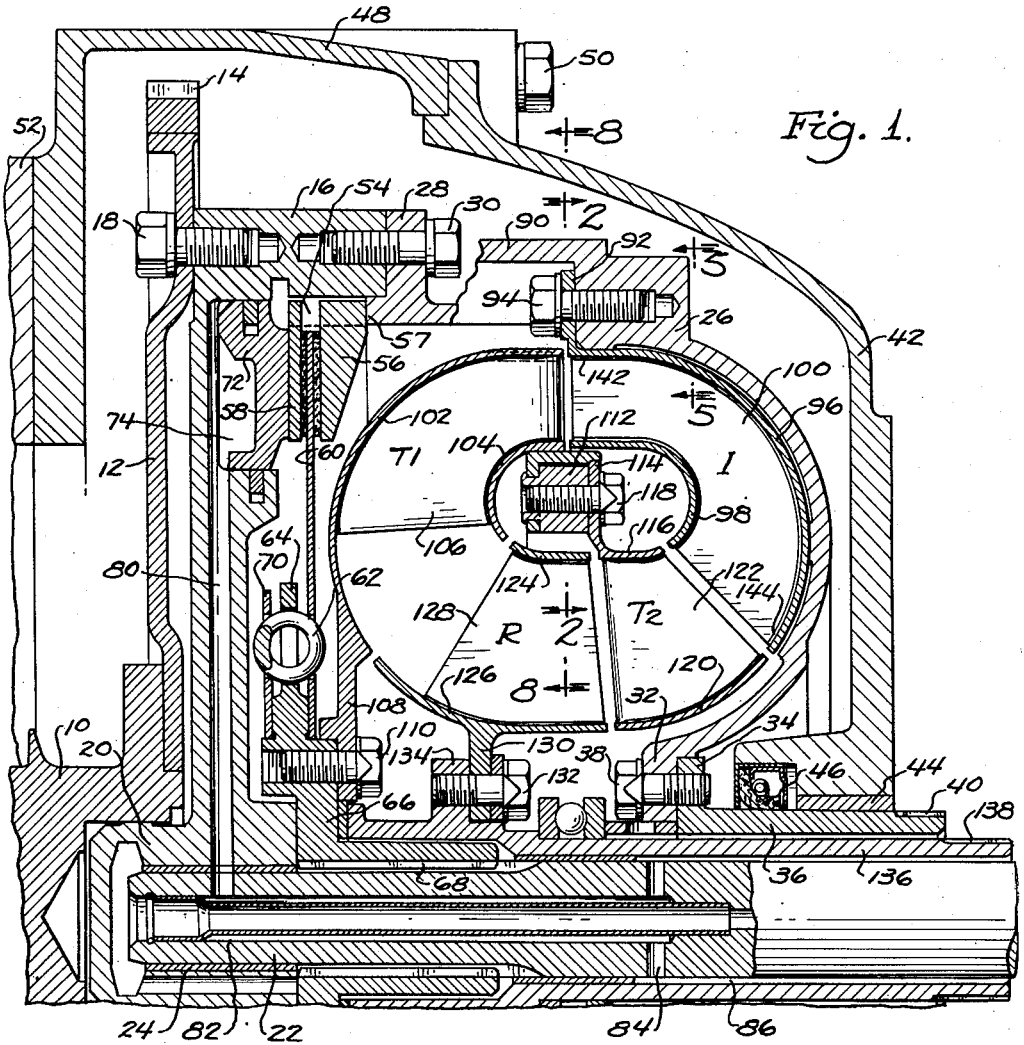
Fig. 1.
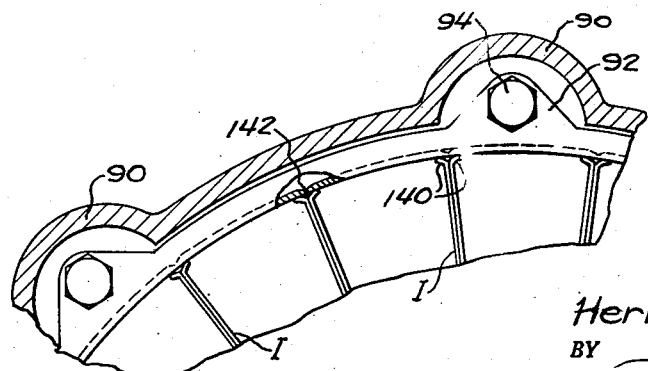
Fig. 2.
INVENTOR.
Herbert L. Misch
BY
ATTORNEY.

INVENTOR.
Herbert L. Misch

INVENTOR.
Herbert L. Misch

Oct. 19, 1954  H. L. MISCH  2,691,812
METHOD OF FORMING FLUID TURBINE ELEMENTS AND THE LIKE
Filed April 11, 1949  5 Sheets-Sheet 4
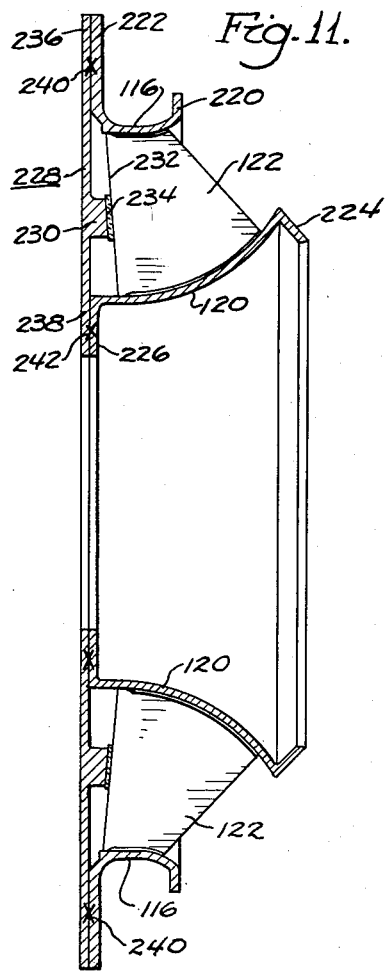
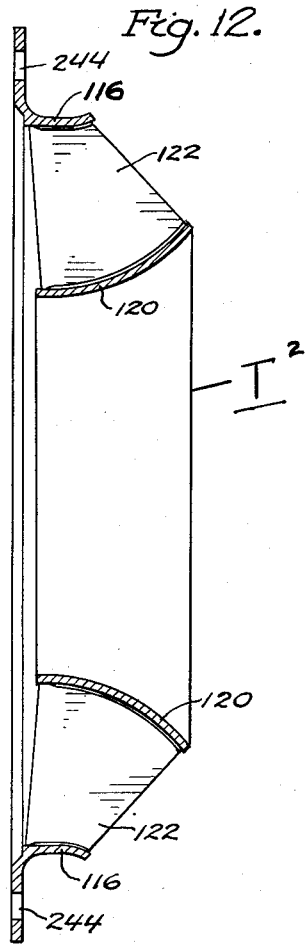
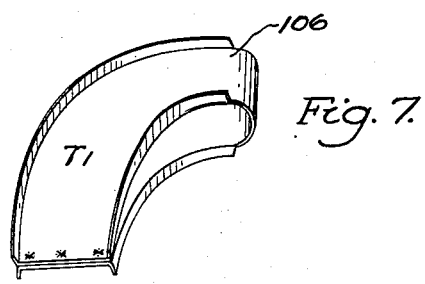
INVENTOR.
Herbert L. Misch
BY
ATTORNEY.

Oct. 19, 1954  H. L. MISCH  2,691,812
METHOD OF FORMING FLUID TURBINE ELEMENTS AND THE LIKE
Filed April 11, 1949  5 Sheets-Sheet 5
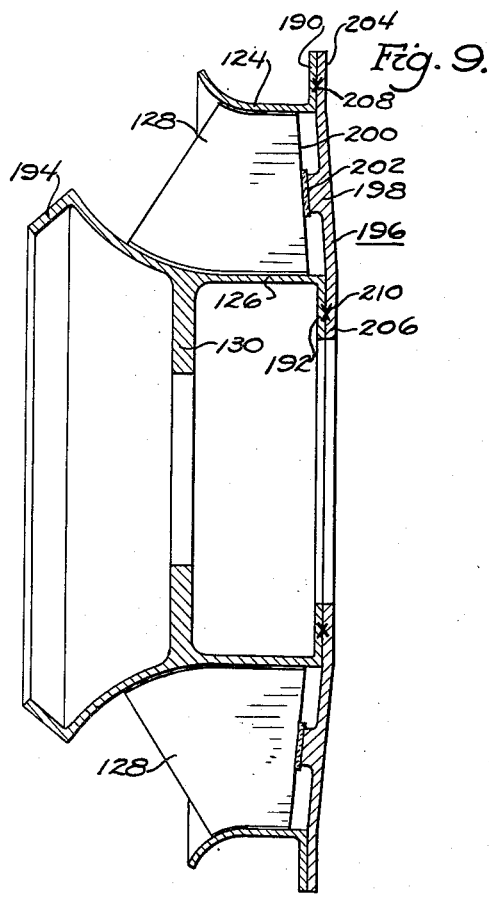
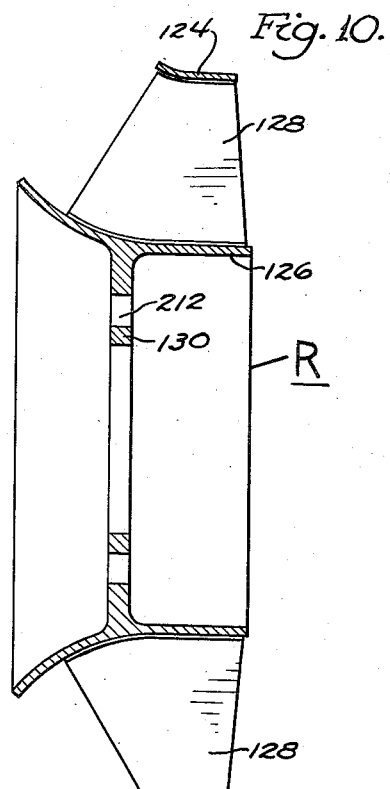
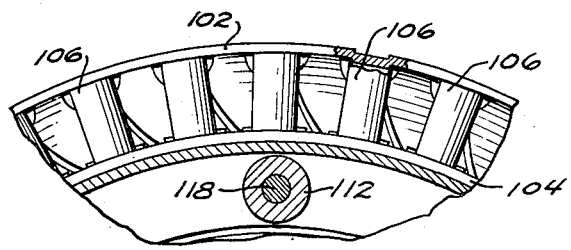
INVENTOR.
Herbert L. Misch
BY
ATTORNEY.

Patented Oct. 19, 1954

2,691,812

UNITED STATES PATENT OFFICE 2,691,812

METHOD OF FORMING FLUID TURBINE ELEMENTS AND THE LIKE

Herbert L. Misch, Toledo, Ohio, assignor to Packard Motor Car Company, Detroit, Mich., a corporation of Michigan Application April 11, 1949, Serial No. 86,776

9 Claims. (Cl. 29—156.8)

This invention relates to transmissions and more particularly to the making of fluid energizing, energy absorbing and fluid deflecting members of fluid operated transmissions of the torque converter and fluid coupling types.

In the operation of devices of these types torque is imparted to a fluid by a rotatable vaned impeller, and torque is absorbed from the fluid by a rotatable vaned turbine member. In the torque converter the fluid is redirected by a vaned reaction member in such a manner that a backwardly directed force is exerted on the reaction member to increase the torque exerted on the turbine or driven member.

For most efficient operation the vanes of the impeller, turbine and reaction members interposed between outer shell and inner shroud members should embody different contours, and the fluid channels through the various members should be free from abrupt changes of contour that would cause turbulence and increase the resistance to fluid flow therethrough. It is therefore desirable that well rounded fillets be provided at the junctures of the edges of the vanes with the outer shell and the inner shroud members to minimize resistance to fluid flow.

In my copending application Serial Number 52,078, filed September 30, 1948, I disclosed a method of forming these rotatable members whereby vanes embodying any desired contour were provided with bent over inner and outer edges. These vanes were assembled between spaced shell and shroud members, and the bent over edges of the vanes were forced into intimate contact with the surfaces of the shell and shroud members by the application of pressure urging the shell and shroud members toward each other. The edges of the vanes were bent outwardly to provide the desired continuous contact with the shell and shroud members thereby compensating for manufacturing irregularities in the vanes. Clamping fixtures engaging the shell and shroud members were employed to hold the bent over edges of the vanes in the desired contacting position with the shell and shroud members, and the assembly thus formed was subjected to heat for brazing or otherwise bonding the vanes to the shell and shroud members. It was necessary that the clamping fixtures remain on the shell and shroud members during the brazing or other fusing operation. This necessitated that clamping fixtures be provided for each assembly being brazed at a given time, and resulted in an undesirable expenditure for tooling.

An object of the present invention is therefore to provide an improved method of holding fluid deflecting vanes in a desired assembled relation in spaced shell and shroud members without the use of expensive clamping fixtures at the time of the heating operation.

A further object is in the provision of securing means as an integral part of one of the members for attachment to the other member for holding the parts in the clamped position during the brazing or other fusing operation whereby the vanes are secured to the shell and shroud members.

Still a further object of the invention resides in the use of a holding member in the form of an annular diaphragm carried by an inner shroud and adapted to be secured to an outer shell as by spot welding to maintain a plurality of spaced vanes in a predetermined clamped position relative to the shroud and shell members while the vanes are being secured to the shell and shroud members by a brazing or other fusing operation.

Another object of the invention is to provide angularly related reenforcing members carried by spaced shell and shroud members to render the shell and shroud members sufficiently stiff that stamped contoured vanes having bent over edges can be compressed between them thus compensating for manufacturing irregularities by crushing the edges of the vanes into firm surface contact with the surfaces of the shell and shroud members.

Still another object resides in the use of a diaphragm shaped member carried by either the shroud or shell member, and adapted to be secured to the other as by a welding operation to maintain the edges of contoured vanes in a predetermined position relative to the shell and shroud members preparatory to bonding the vanes to the shell and shroud members by a brazing or other fusing operation.

A further object of the invention is to provide a novel method of securing vanes to spaced shell and shroud members.

Yet another object of the invention resides in the provision of a method of using a member shaped in the form of an annular yielding diaphragm formed on one member and adapted to be spot welded to the reenforcing flange formed on the other of the spaced shell and shroud members to maintain the shell and shroud members in a predetermined clamped position relative to a plurality of spaced vanes interposed therebetween while brazing or otherwise bonding the elements together whereupon the diaphragm may then be removed.

Still a further object of the invention is to provide an improved method of maintaining pressure on fluid deflecting vanes interposed between spaced shell and shroud members by securing as by welding a yielding diaphragm shaped member formed on one of a pair of the shell and shroud members to the other of said members to hold the assembly in a substantially predetermined position without resorting to the use of clamping fixtures or other tooling while brazing or otherwise bonding the elements together whereupon the diaphragm may then be removed.

Other objects and advantages of this invention will appear from the following description and appended claims, reference being had to the accompanying drawings which form a part of this specification, and in which:

Fig. 1 is a sectional view of a fluid torque converter embodying elements made in accordance with this invention.

Fig. 2 is a fragmentary sectional view taken substantially on the line 2—2 of Fig. 1, looking in the direction of the arrows.

Fig. 7 is a perspective view illustrating one of the fluid deflecting vanes of the first stage turbine.

Fig. 8 is a fragmentary front elevational view partly in section of the first stage turbine member illustrated in Fig. 6.

Figs. 9 and 10 are views similar to Figs. 3 and 4 illustrating a reaction member.

Figs. 11 and 12 are also views similar to Figs. 3 and 4 illustrating a second stage turbine member.

Figure 3:
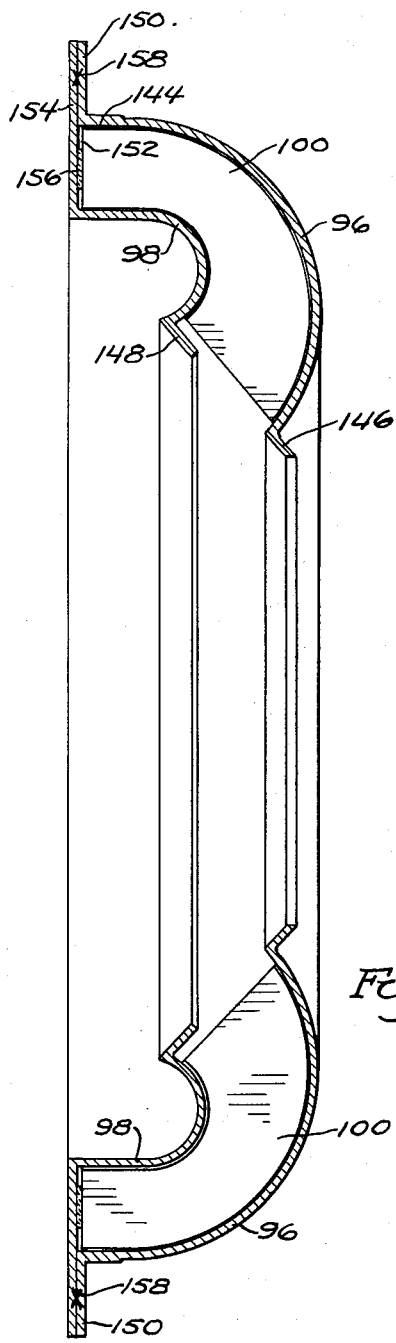
Fig. 3 is a sectional view of an impeller illustrating the fluid deflecting vanes positioned in the outer shell and inner shroud members with the shell and shroud members secured together as by a welding operation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1, it will be noted that a crankshaft or driving shaft 10 is provided with a disk 12 having a starter gear 14 secured thereto. A driving member 16 is secured to the disk 12 as by screws 18, and has a hub 20 projecting into the end of the crankshaft or driving shaft 10. A driven shaft 22 aligned with the driving shaft 10 is journalled on a bearing 24 in the hub 20 of the driving member 16.

An impeller shell 26 having a flange 28 is secured to the driving member 16 as by screws 30. At its opposite end the impeller shell 26 has an inwardly directed flange 32 secured to a flange 34 of a sleeve 36 as by screws 38, the sleeve 36 preferably having splines 40 to drive a pump to supply fluid under pressure to actuate various controls of the transmission.

A housing having a rear section 42 is provided to overlie the impeller shell 26 and to support the sleeve 36 through a bearing 44. An oil seal 46 interposed between the rear section of the housing 42 and the sleeve 36 is provided to prevent the escape of oil between the sleeve 36 and the housing 42. The rear section 42 of the housing is secured to a front housing section 48 by means of screws 50, and the front housing 48 is secured to a portion of an engine such as a cylinder block 52 in any suitable manner.

In the embodiment illustrated a direct drive clutch is interposed between the driving member 16 and the driven shaft 22 to provide a direct drive in parallel with the torque converter when the clutch is engaged. The driving member 16 is provided with splines 54 adapted to receive a clutch backing plate 56 abutting axially extended portion 57 of the impeller shell 26. A clutch driving disk 58 is slidably mounted on the splines 54 to subject a clutch driven plate 60 to pressure thereby transferring a drive to the shaft 22 through a resilient coupling such as a plurality of coiled springs 62 interposed between the driven plate 60 and a flange 64 of a hub 66 secured to the driven shaft 22 by splines 68. The springs are positioned in circumferentially extending slots formed in the driven plate 60 and the flange 64, a disk 70 secured to the driven plate 60 being provided to balance the driving forces exerted on the springs 62.

The impeller shell 26 is provided with spaced bosses 90 adapted to receive radially extended attaching tabs 92 of an impeller I adapted to be secured thereto by screws 94. The impeller I has an outer shell 96, an inner shroud 98, and a plurality of spaced fluid energizing vanes 100 interposed between and secured to the outer shell 96 and to the inner shroud 98.

The impeller I imparts energy to a circulating fluid and discharges it to a first stage turbine T1 having an outer shell 102 and an inner shroud 104 interconnected by energy absorbing vanes 106. The outer shell 102 of the turbine T1 has an inwardly directed flange 108 secured by means of screws 110 to the hub 66 splined to the driven shaft 22.

The inner shroud 104 of the first stage turbine T1 is provided with a plurality of spaced bosses 112 to receive an attaching flange 114 carried by an inner shroud 116 of a second stage turbine T2 adapted to be secured thereto by screws 118. The second stage turbine T2 has an outer shell 120 spaced from the inner shroud 116, and a plurality of vanes 122 are interposed between and are secured to the inner shroud 116 and the outer shell 120.

A reaction member R is interposed between the first and second stage turbines T1 and T2, and has an inner shroud 124 and an outer shell 126 with vanes 128 interposed therebetween. The outer shell 126 is provided with an inwardly extending flange 130 adapted to be secured by means of screws 132 to a flange 134 of a sleeve 136 interposed between the sleeve 36 rotatable with the impeller shell 26 and the driven shaft 22. The sleeve 136 is provided with splines 138 adapted to receive a one-way clutch to restrain the reaction member R from rotating backwardly in the fluid circuit when the device is operating as a torque converter, and to permit it to rotate forwardly in the circuit when the device is operating as a fluid coupling, at which time power is transmitted from the driving member to the driven member with no multiplication of torque.

My copending application Serial Number 52,078 discloses an improved method of forming the vanes of a torque converter or a fluid clutch in such a manner that bent over edges 140 as illustrated in Fig. 2 are formed at the edges of the vanes which contact the outer shell and the inner shroud of the various members. Spaced locating means such as 142 in Fig. 2, and 144 in Fig. 1 are employed to locate the vanes in the proper spaced relation in the shell and shroud members.

In order to overcome the necessity of providing holding fixtures for each assembly being brazed or other otherwise treated at a single time to hold the bent over edges of the vanes in intimate contact with the surfaces of the shroud and shell members I have devised an improved method of securing the members together in such a manner that clamping fixtures are unnecessary.

Referring now to Fig. 3 illustrating the formation of the impeller I, it will be noted that the outer shell 96 and the inner shroud 98 are provided with reenforcing flanges 146 and 148 at their inner diameters to strengthen these portions of the unit and prevent them from flexing to any material degree when subjected to the necessary relatively high pressure required to crush and hold the bent over edges 140 of the vanes in firm contact with the shell and shroud members. The outer diameter of the shell 96 is provided with a radial flange 150 preferably terminating slightly forwardly of the outlet ends 152 of the impeller vanes 100. The inner shroud 98 is also provided with a radial flange 154 preferably in the form of an annular diaphragm having its rear surface positioned slightly forwardly of the outlet ends 152 of the impeller vanes 100, and adapted to engage the forward surface of the flange 150 when the vanes 100 have been compressed between the outer shell 96 and the inner shroud 98 to position their bent over edges 140 in the desired firm contact with the surfaces of the shell and shroud members.

A suitable insulator 156 capable of withstanding relatively high temperature, such as a piece of mica, is interposed between the ends 152 of the vanes 100 and the adjacent surface of the flange 154. The flanges 150 and 154 are then secured together in any convenient manner as by spot welding indicated at 158 to maintain all the parts in position forming an assembly. The elements forming the assembly may then be joined together metallurgically to form the desired element.

The operation of making this impeller is as follows. The outer shell 96 and the inner shroud 98 are formed of steel or other suitable material, and are contoured as illustrated in Fig. 3 by a stamping or other suitable operation. A plurality of vanes 100 are formed as disclosed in my copending application Serial Number 52,078 by a stamping or other suitable shearing and folding or bending operation. A plurality of the vanes thus formed are positioned in the outer shell with the bent over edges 140 contacting the concave inner surface of the shell. The vanes are positioned on the locators 142 and 144 to accurately locate them. The insulating material 156 is then secured to the ends 152 of the vanes, or is secured to the surface of the diaphragm shaped member 154 of the inner shroud 98.

The shroud 98 is then positioned on the vanes 100 with its convex surface contacting the angularly related flanges of the vanes. Pressure from any suitable source, such as a press is exerted to urge the shroud 98 and the shell 96 toward each other, a suitable fixture being provided to spread the load over a relatively large surface area of the shell and shroud members.

The shell, shroud and vanes are proportioned so that when the surface of the diaphragm shaped member 154 carried by the shroud 98 engages the flange 150 carried by the shell 96 the bent over edges 140 of the vanes are positioned in firm contact with the concave surface of the outer shell 96 and the convex surface of the inner shroud 98. The diaphragm shaped member 154 and the flange 150 are then secured together as by the spot welding 158 or in any other suitable manner to hold the vanes in the desired intimate contact with the shell and shroud members. The pressure exerted on the shell and shroud members to force the bent over edges 140 of the vanes to the desired contacting position with the shell and shroud members may then be released, and the diaphragm shaped member 154 exerts a yielding force to maintain the bent over edges 140 of the vanes in the desired contacting position with the shell and shroud members.

If the members are to be secured together by a brazing operation, suitable soldering material such as a copper alloy is applied to the edges of the vanes which contact the shell and shroud members either before or after the members are assembled. It will of course be apparent that the solder can be applied in any desired manner as by spraying, painting the contacting edges of the vanes with a soldering solution, or otherwise.

After the soldering agent has been applied, the assembly is subjected to the heat of a brazing operation, preferably in the presence of an inert atmosphere to minimize oxidation. It will be noted that the insulating material 156 prevents the ends 152 of the vanes 100 from fusing with the flange 154 carried by the inner shroud 98. It will of course be apparent that the assembly may be joined together metallurgically in any desired manner as by welding or fusing or in any other convenient manner.

When the assembly has thus been secured together, the reenforcing flanges 146 and 148 carried at the inner edges of the outer shell and the inner shroud members 96 and 98 are removed by any suitable machining operation, and the portion of the diaphragm shaped member 154 which overlies the ends 152 of the vanes 100 is also removed by any suitable machining operation. The assembly is then complete and ready for use after drilling the apertures 160 in the flanges 150 and the portion of the diaphragm shaped member 154 secured to the flange 150 as illustrated in Fig. 4 to receive the screws 94 illustrated in Fig. 1 to secure the impeller I to the impeller shell 26.

Figure 4:
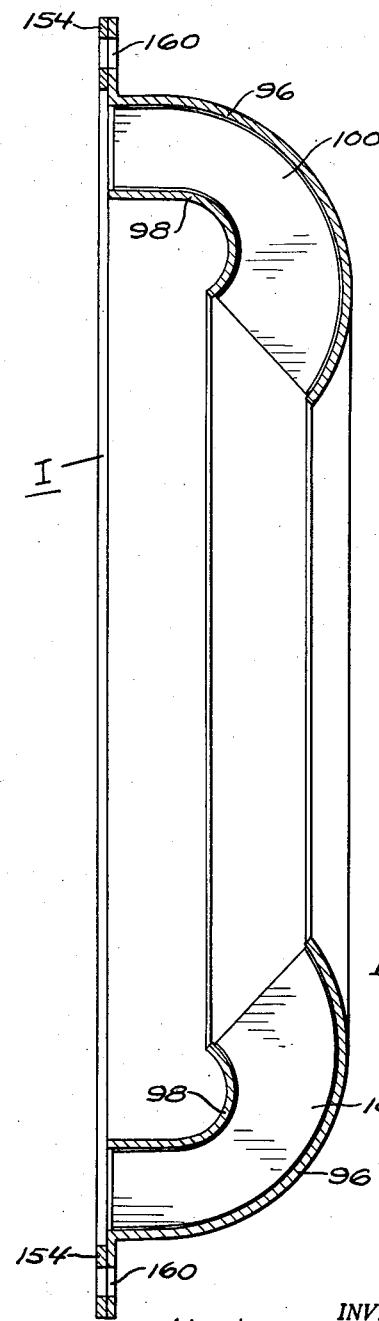
Fig. 4 is a view similar to Fig. 3 showing the impeller in the completed form.
Figure 5:
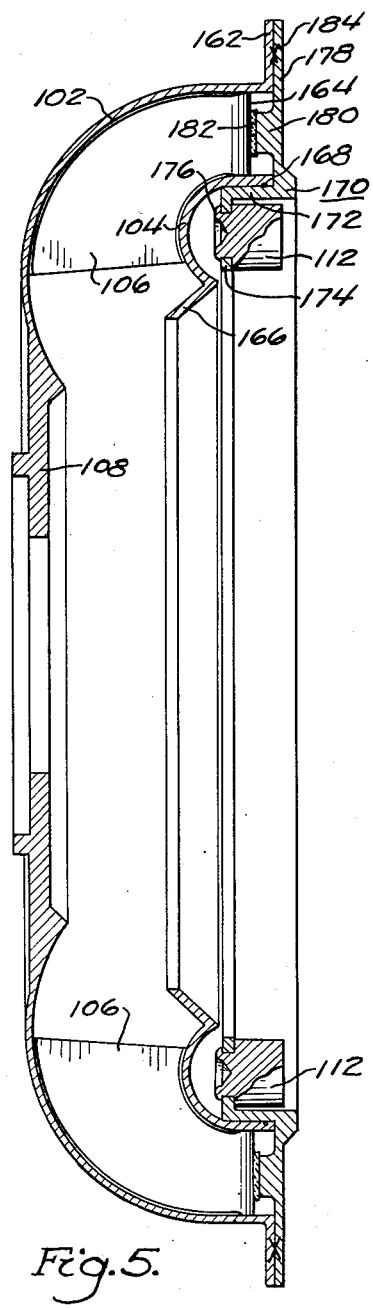
Figs. 5 and 6 are views similar to Figs. 3 and 4 but illustrating the first stage turbine member of a torque converter.
Figure 6:
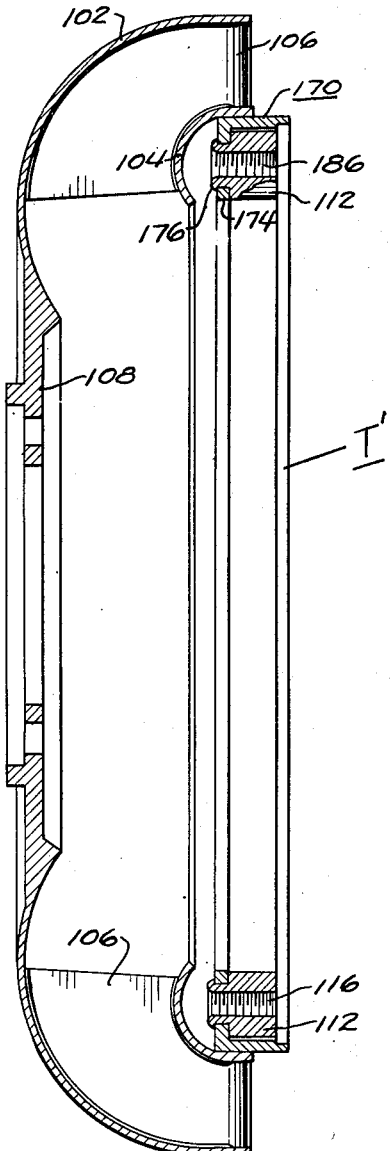

The first stage turbine T1 more clearly illustrated in Figs. 5 and 6 is fabricated in a manner similar in many respects to the impeller I illustrated in Figs. 3 and 4.

The inwardly directed flange 108 carried by the outer shell 102 for securing the turbine to the hub 66 splined to the driven shaft 22 reenforces the inner portion of the outer shell. A reenforcing and locating flange 162 is formed on the outer periphery of the outer shell 102, and preferably is positioned slightly beyond the inlet edges 164 of the turbine vanes 106 as illustrated in Fig. 5.

The inner periphery of the inner shroud 104 is provided with a reenforcing flange 166 to increase the rigidity of this portion of the shroud 104. The outer periphery of the inner shroud 104 projects somewhat beyond the inlet edges of the turbine vanes 106, and is preferably provided with an internal annular groove 168.

A member in the form of an annular diaphragm 170 has an axially extending portion 172 adapted to project into the axially extending portion of the inner shroud 104 with or without a press fit and has a radially inwardly directed flange 174 having spaced apertures to receive the second stage turbine attaching bosses 112. The bosses 112 are formed with projections adapted to extend through the apertures and be peened over as illustrated at 176 to retain the bosses in place until the assembly is fused together as hereinafter more fully described. The diaphragm shaped member 170 is provided with a radially outwardly extended portion 178 adapted to align with and abut the locating flange 162 formed on the outer shell 102. The portion 178 of the member 170 is provided with an annular projection 180 adapted to exert pressure on the inlet edges 164 of the vanes 106 through an insulator 182 to insure firm contact between the bent over edges of the vanes and the contacted surfaces of the shell and shroud members 102 and 104 as the assembly is moved to the position illustrated in Fig. 5.

In the formation of the first stage turbine T1 the outer shell and inner shroud members 102 and 104 are formed with the reenforcing flanges thereon in any suitable manner as by a stamping operation. A plurality of the vanes 106 are formed as disclosed in my copending application Serial Number 52,078, and are positioned on the locators provided between the outer shell and the inner shroud. The diaphragm shaped member 170 having the bosses 112 secured therein is positioned as illustrated in Fig. 5 with the annular projection 180 adapted to exert pressure on the inlet edges 164 of the turbine vanes 106 through the insulating material 182. The assembly thus formed is positioned in a press or other suitable mechanism and pressure is exerted to move the diaphragm shaped member 170 axially in the direction of the shell 102. The member 170 abuts the outer edge of the inner shroud 104 at the juncture between its axially extended portion 172 and its radially extended portion 178 thereby forcing the bent over edges of the vanes 106 into firm contact with the concave surface of the outer shell 102 and the convex surface of the inner shroud 104. The diaphragm shaped member 170 is proportioned so that when its radially extended portion 178 contacts the flange 162 of the outer shell 102, the vanes 106 will be positioned in the desired relation in the shell and shroud members. The member 178 is then secured to the flange 162 in any suitable manner as by spot welding illustrated at 184 to hold the parts in position forming an assembly. The diaphragm flexes slightly to exert a yielding force to maintain the bent over edges of the vanes in firm contact with the shell and shroud members.

With the assembly thus formed the whole is subjected to the heat of a brazing or fusing operation, such as a copper brazing process to securely fasten the vanes 106 to the shell and shroud members 102 and 104 in the manner described in connection with the impeller I.

It will of course be understood that before being subjected to the brazing operation the edges of the vanes 106 which contact the shell and shroud members are treated in such a manner that solder or other brazing agent is applied thereto.

Copper or other suitable soldering agent may also be interposed between the axially extending portion 172 of the fixture 170 and the contacting inner surface of the shroud 104. One desirable method of applying solder at this location resides in positioning a copper wire in the internal groove 168 formed in the outer extremity of the inner shroud 104. The brazing operation is preferably performed in the presence of an inert gas to minimize oxidation.

After the brazing operation has been performed a portion of the diaphragm shaped member 170 is cut away from the shell and shroud members in any suitable manner as by a machining operation severing the outer shell 102 and inner shroud 104 at a point substantially in radial alignment with the inlet edges 164 of the vanes 106. The reenforcing flange 166 formed on the inner shroud 104 is severed somewhat beyond the outlet from the vanes 106 as illustrated in Fig. 6. The bosses 112 are then threaded as illustrated at 186 to receive the screws 118 which secure the second stage turbine T2 thereto.

The formation of the reaction member R is similar in many respect to the formation of the other members described above, and as illustrated in Figs. 9 and 10. The inner shroud 124 is provided with a reenforcing flange 190, and the outer shell 126 is provided with reenforcing flanges 192 and 194 positioned at its opposite ends. The inwardly directed flange 130 by which the reaction member is secured to the sleeve 136 as illustrated in Fig. 1 is preferably secured to the outer shell between the radially extended flanges 192 and 194.

A diaphragm shaped member 196 is provided with an annular projection 198 adapted to exert pressure on the adjacent edges 200 of the vanes 128 through an insulating member 202. In the formation of the reaction member the vanes 128 are assembled in the outer shell 126 by means of locators similar to the locators 142 and 144 described above. The inner shroud 124 is positioned against the vanes, and pressure is exerted through the annular projection 198 of the fixture 196 to force the bent over edges of the vanes into the desired intimate contact with the inner shroud and outer shell members 124 and 126 respectively. When the flanges 190 and 192 carried by the shroud and shell members are contacted by the surfaces 204 and 206 of the diaphragm shaped member 196, the vanes are positioned in the desired relation to the shroud and shell members. The surfaces 204 and 206 of the diaphragm shaped member 196 are then secured to the flanges 190 and 192 of the shroud and shell members as by spot welding illustrated at 208 and 210 whereupon the assembly is ready for the brazing or other fusing operation to secure the assembly together as described in connection with the other assemblies.

After the assembly has been secured together, the flanges 190, 192, and 194 are removed as by any suitable machining operation whereupon the reaction member as illustrated in Fig. 10 is complete. The inwardly directed flange 130 is drilled as illustrated at 212 to receive the screws 132 by which the reaction member is secured to the sleeve 136 as illustrated in Fig. 1.

The second stage turbine T2 is formed in a manner substantially the same as that described in connection with the formation of the reaction member. It will be noted that the inner shroud 116 is provided with reenforcing flanges 220 and 222 and that the outer shell 120 is provided with reenforcing flanges 224 and 226. A diaphragm shaped member 228 has an annular projection 230 adapted to exert force on the edges 232 of the vanes 122 through the insulating material 234. When the elements have been assembled and forced into the desired relation by the application of pressure through the diaphragm shaped member 228 as described in connection with the formation of the other elements the surfaces 236 and 238 of the member 228 contact the flanges 222 and 226 of the inner shroud and outer shell members. These flanges are then secured together as by spot welding illustrated at 240 and 242. The assembly is then subjected to the brazing or other fusing operation and the reenforcing flanges 220, 224 and 226 are removed. The flange 222 is drilled as illustrated at 244 in Fig. 12 to receive the screws 118 which as illustrated in Fig. 1 secure the second stage turbine to the bosses 112 of the first stage turbine T1.

It will of course be understood that the vanes of the various members may embody any desired contour as more clearly pointed out in copending application Serial Number 52,078. The showing of the vanes in Figs. 7 and 8 is merely for illustrative purposes and discloses vanes of a type which have proven to be desirable for use in the first stage turbine T1.

It will be understood that various forms of the invention other than those described above may be used without departing from the spirit or scope of the invention.

I claim:

1. The method of making a rotatable part of a fluid transmission which comprises forming shell and shroud members with radially extending flanges, one of said flanges taking the form of of a yielding diaphragm, positioning a plurality of fluid deflecting vanes between said members, pressing the shell and shroud members to a position in which said flanges are in contact with each other and the vanes are in firm edge contact with the shell and shroud respectively, securing said flanges together to hold all parts in position forming an assembly, releasing the pressing action so that the diaphragm may exert a yielding force to hold the shell and shroud in contact with the edges of the vanes, heating the assembly to metallurgically join all contacting parts, and thereafter removing such portions of the flanges as are unnecessary to the operation of the rotatable member.

2. The method of making a rotatable part of a fluid transmission which comprises forming shell and shroud members, having reenforcing flanges, one of said flanges taking the form of a yielding diaphragm, positioning a plurality of vanes between said members, assembling the shell and shroud members with said diaphragm overlapping a flange of the other member, positioning insulating material between said diaphragm and the vanes, pressing the shell and shroud members toward each other to engage the diaphragm with the flange of the other member and with the vanes in firm edge contact with the shell and shroud members, securing said flanges together to hold all parts in position forming an assembly, releasing said pressing action so that said diaphragm may exert a yielding force to hold the shell and shroud in contact with the edges of the vanes, heating the assembly to join all uninsulated contacting parts, and thereafter removing the insulation and such portions of the flanges and the diaphragm as are unnecessary to the operation of said rotatable part.

3. The method of making a rotatable member of a fluid transmission which comprises forming outer shell and inner shroud members having reenforcing flanges, at least one of said flanges being yieldable, positioning a plurality of fluid deflecting vanes between said shell and shroud members, pressing the shell and shroud members toward each other to bring two of said reenforcing flanges into overlapping contact and to position the edges of the vanes in firm contact with the surfaces of the shell and shroud members, securing the overlapping flanges of said shell and shroud members together by attaching a portion of one of the reenforcing flanges carried by one of the members to the other member, releasing said pressing action, then metallurgically joining the vanes to the shell and shroud members, and thereafter removing certain of the reenforcing flanges from the shell and shroud members.

4. The method of forming a rotatable member of a fluid transmission which comprises forming double walled fluid deflecting vanes having diverging bent over edges, forming outer shell and inner shroud members having reenforcing flanges, one of said flanges taking the form of a yielding diaphragm, interposing a plurality of said vanes between formed shell and shroud members, urging the shell and shroud members toward each other to bring said diaphragm into overlapping position with a flange on the other of said members and to dispose the bent over edges of the vanes in firm contact with the confronting surfaces of the shell and shroud members, pressing said members together while securing the flange and diaphragm of said shell and shroud members to each other by spot welding overlapping portions thereof, releasing said pressing action so that the diaphragm may exert a yielding force to hold said members together in contact with the edges of the vanes, metallurgically joining the vanes to the shell and shroud members, and thereafter removing certain of the reenforcing flanges from the shell and shroud members.

5. The method of making a rotatable member of a fluid transmission which comprises forming a plurality of fluid deflecting vanes each having diverging bent over edges, forming outer shell and inner shroud members each having a reenforcing flange at its outer and inner periphery, at least one of said flanges being yieldable, positioning a plurality of said fluid deflecting vanes between said shell and shroud members, pressing one of the reenforcing flanges of the shroud into firm contact with one of the reenforcing flanges of the shell to position the bent over edges of each of the vanes in substantial surface contact with the confronting surfaces of the shell and shroud members, securing the shell and shroud members in said position relative to each other by securing said reenforcing flange carried by one of the members to the contacting reenforcing flange carried by the other member, releasing said pressing action, metallurgically joining the vanes to the shell and shroud members, and thereafter removing certain of the reenforcing flanges from the shell and shroud members.

6. The method of making a fluid transmission rotor which comprises forming outer shell and inner shroud members having reenforcing flanges at their inner peripheries, the outer shell having an outwardly extended flange formed at its outer periphery, the inner shroud having an outwardly extended flange formed at its outer periphery and adapted to overlie and engage the outwardly extended flange formed at the outer periphery of the outer shell, positioning a plurality of fluid deflecting vanes between said shell and shroud members, moving the shell and shroud members toward each other to engage the outwardly extended flange formed at the outer periphery of the shroud with the outwardly extended flange formed at the outer periphery of the outer shell to position the vanes in firm contact with the surfaces of the shell and shroud members, securing together the outwardly extended flanges of the shell and shroud members to maintain the vanes in said firm contact with the shell and shroud members, metallurgically joining the vanes to the shell and shroud member, and thereafter removing the reenforcing flanges from the inner peripheries of the shell and shroud members and interrupting the outwardly extended flange formed at the outer periphery of the shroud in substantial alignment with the shroud and shell members.

7. The method of making an impeller for a fluid transmission which comprises forming a plurality of fluid energizing vanes each having bent over edges, forming outer shell and inner shroud members having reenforcing flanges at their inner peripheries, the outer shell having an outwardly extended attaching flange formed at its outer periphery, the inner shroud having an outwardly extended flange formed at its outer periphery and adapted to overlie and engage the attaching flange of the outer shell, positioning a plurality of said fluid energizing vanes between said shell and shroud members, moving the shell and shroud members toward each other to compress the bent over edges of the vanes into firm contact with the surface of the shell member and the confronting surface of the shroud member and to engage the outwardly extended flange formed at the outer periphery of the shroud with the attaching flange of the outer shell, securing together the attaching flange and the outwardly extended flange of the shroud member to maintain the vanes in said firm contact with the shell and shroud members, metallurgically joining the vanes of the shell and shroud member, and thereafter removing the reenforcing flanges from the inner peripheries of the shell and shroud members and interrupting the outwardly extended flange formed at the outer periphery of the shroud in substantial alignment with the shroud and shell members.

8. A method of forming a rotatable part of a fluid transmission which comprises forming flanged shell and shroud members with the flange on one of said members forming a substantially radial yielding diaphragm, positioning a plurality of vanes between said members, pressing the flanges of the shell and shroud members together, said vanes being positioned between and in firm edge contact with the shell and shroud members, securing the said diaphragm of the one member to the flange of the other member to hold all parts in position forming an assembly, releasing the pressing action, heating the assembly to join all contacting parts, and thereafter removing such portions of said diaphragm as are unnecessary to the operation of said rotatable part.

9. A method of forming a rotatable part of a fluid transmission which comprises forming flanged shell and shroud members with the flange on one of said members forming a substantially radial yielding diaphragm, positioning a plurality of vanes between said members, said vanes being positioned juxtaposed said diaphragm, positioning insulating material between the radial diaphragm and the vanes, pressing the flanges of the shell and shroud members together with the vanes between them in firm edge contact with the shell and shroud members, securing said diaphragm of the one member to the flange of the other member to hold all parts in position forming an assembly, releasing said pressing action, heating the assembly to join all contacting parts, and thereafter removing such portions of said diaphragm as are unnecessary to the operation of said rotatable part.

References Cited in the file of this patent

UNITED STATES PATENTS

| Number | Name | Date |
|---|---|---|
| 1,362,853 | Darling | Dec. 21, 1920 |
| 1,551,342 | Steenstrup | Aug. 25, 1925 |
| 1,565,374 | Kramer | Dec. 15, 1925 |
| 1,713,173 | Dickinson | May 14, 1929 |
| 1,938,382 | Haigh | Dec. 5, 1933 |
| 2,000,692 | Dimberg | May 7, 1935 |
| 2,077,688 | Gottlieb | Apr. 20, 1937 |
| 2,108,209 | Reilly | Feb. 15, 1938 |
| 2,328,393 | Neracher | Aug. 31, 1943 |
| 2,347,071 | Bailey | Apr. 18, 1944 |
| 2,387,722 | Dodge | Oct. 30, 1945 |
| 2,438,867 | Rockwell | Mar. 30, 1948 |